United States Patent Office
3,839,469
Patented Oct. 1, 1974

3,839,469
REDUCTIVE CHLORINATION OF CERTAIN ALKYLPHENOLS
Robert J. Laufer, Colts Neck, N.J., assignor to Continental Oil Company, Ponca City, Okla.
No Drawing. Continuation-in-part of application Ser. No. 682,600, Nov. 13, 1967. This application Oct. 30, 1970, Ser. No. 85,827
Int. Cl. C07c *39/27*
U.S. Cl. 260—623 H          7 Claims

ABSTRACT OF THE DISCLOSURE

A process for the nuclear chlorination of an alkylphenol which normally forms a non-distillable residue during chlorination, in addition to the desired product, wherein said phenol is chlorinated in the presence of a reducing agent capable of acting as such in an acidic medium, with the result that little or no residue is formed.

RELATED APPLICATION

This application is a continuation-in-part of my copending application, Ser. No. 682,600, filed Nov. 13, 1967.

BACKGROUND OF THE INVENTION

(1) Field of the Invention

This invention relates to the nuclear chlorination of alkylphenols. Chlorinated alkylphenols, in general, have excellent pesticidal properties, and hence have found extensive use as pesticides.

(2) Description of the Prior Art

The chlorination of most alkylphenols is generally an uncomplicated process, proceeding to completion with high yields of the desired products. This is true whether direct or indirect methods of chlorination are employed. The direct methods include reaction of the phenol with chlorine itself, or with $SO_2Cl_2$ or (t-Bu)OCl. Indirect methods include chlorination of an acetate or of a sulfonic acid derivative.

However, there are certain alkylphenols which, upon chlorination by either direct or indirect methods, yield in addition to the desired chlorinated product a by-product in the form of a non-distillable residue. The yield of desired product is thus adversely affected. Examples of such alkylphenols are 3,4-xylenol, 2,4,5-trimethylphenol, 3,4,5-trimethylphenol and 4-isopropyl-m-cresol. Prior workers have apparently accepted the formation of a large amount of residue as unavoidable. For example, British Pat. 1,037,548 describes a process for the preparation of 6-chloro-3,4-xylenol wherein 3,4-xylenol is chlorinated with sulfuryl chloride in the presence of a cupric chloride catalyst. The yield of 6-chloro-3,4-xylenol obtained in the example cited was only about 37 percent of theory, based on 3,4-xylenol charged. U.S. Pat. No. 3,401,205 also describes the chlorination of 3,4-xylenol, but without a catalyst. A yield of about 70 percent of monochloro-3,4-xylenol was obtained.

SUMMARY OF THE INVENTION

In accordance with the present invention, an improved process is provided for chlorinating alkylphenols which normally form a non-distillable by-product residue during the chlorination whereby the production of the objectionable residue is avoided and yields greatly in excess of 70 percent of the mono-chloro-substituted phenol are obtained. The improvement comprises conducting the chlorination in the presence of a reducing agent capable of acting as such in an acidic medium. Nearly quantitative yields of the desired chloroalkylphenols are thereby obtained.

The undesirable residue is the polymerization product of a 4-chloro-2,5-cyclohexadienone. The latter compound is apparently formed initially during the chlorination and is then polymerized at the elevated temperatures to the nondistillable residue. The 4-chloro-2,5-cyclohexadienone, the precursor to the residue, is easily reduced to the parent phenol by reducing agents capable of acting in an acidic medium. My invention resides in my discovery that such reductions can be effected simultaneously with the chlorination of the alkylphenol to produce the desired chloralkylphenols in nearly quantitative yields. The reducing agent continuously reconverts the 4-chloro-2,5-cyclohexadienone to the starting phenol, thus leaving as the only alternative reaction, the formation of the desired chloralkylphenol.

In its broadest aspect, my improved process is applicable to the nuclear chlorination of any alkylphenol which produces a non-distillable residue during the chlorination. The improvement, in its broadest aspect, may also be described as applicable to the chlorination of any alkylphenol which produces a 4-chloro-2,5-cyclohexadieone during the chlorination. Stable chlorodieones are readily formed in the chlorination of alkylphenols which have at least one open ortho-position, an alkyl group in the para-position which is either a primary or secondary alkyl, and at least one alkyl in a meta-position. However, the formation of chlorocyclohexadienones is not necessarily restricted to such alkylphenols.

Suitable reducing agents are, as stated, those which function in an acidic medium, the latter being formed as a by-product of the primary chlorination reaction. The reduction of halocyclohexadienones is described in the literature (for example, see U.S. Pat. No. 3,035,099). Any metal which displaces hydrogen from hydrochloric acid may be used, but either zinc or iron metal is normally preferred because of lower cost. Other conventional acid-resistant reducing agents such as hydriodic acid or stannous chloride may be used.

The chlorinating agent and reaction conditions for the chlorination are otherwise conventional. Examples of well-known chlorinating agents are chlorine itself, $SO_2Cl_2$, and (t-Bu)OCl. Temperatures frequently used fall within the range —20° C. to 100° C. Pressures within the range of 0.5 to 5 atmospheres are suitable. Catalysts are not generally required. Solvents are generally advantageous. A variety, both polar and non-polar, may be employed. Water or other hydroxylic solvent is required if a metal is used as a reducing agent. Suitable non-polar solvents are hydrocarbons, for example, benzene and hexane. Hydrocarbon solvents are not necessary if the reaction is carried out above the melting point of the phenol to be chlorinated.

The amounts of chlorinating agent and of reducing agent required in my improved process are, I believe, obvious in the light of the previous discussion of the reactions involved. However, some general observations, with illustrations, may be helpful. For convenience, chlorine is used by way of example.

The amount of chlorine required cannot be determined by simple linear stoichiometric calculations. The correct amount of chlorine required for any particular reaction may be calculated from the equation $$\frac{\text{Moles Cl}_2 \text{ required}}{\text{mole phenol}} = 1 + \sum_{n=1}^{n=\infty} x^n = \frac{1}{1-X}$$

where X=the fraction of the phenol converted to dienone under the particular reaction conditions, but without the reducing agent present.

As an example, 3,4-xylenol, non-reductively chlorinated with elemental $Cl_2$ in a benzene, $H_2O$ system at 20° C. gives an estimated 33 percent dienone (Run No.

2, Table I). Therefore, "X"=.33 and the amount of chlorine theoretically required for complete conversion to monochloro-3,4-xylenol under these reaction conditions in the presence of a reducing agent is 1.49 moles per mole of xylenol. Experimentally, it was found that 1.52 moles of chlorine gave virtually complete conversion of xylenol and yields of 87 percent monochloroxylenol and 7.5 percent dichloroxylenol (Run No. 2, Table IV).

The amount of reducing agent present must be at least sufficient for the reduction but it may be present in excess and is easily separated from the reaction mixture. In general, the amount of reducing agent is at least 0.3 mole of reducing agent per mole of the phenol. The amount required may be determined by considering the amount of chlorine required and the type of reducing agent to be employed. The minimum amount of reducing agent required is that quantity which will generate the equivalent of one mole of hydrogen in reducing power for each mole of chlorine consumed beyond one mole per mole of phenol. If the reducing agent will take up two atoms of chlorine, the number of moles of reducing agent should equal about half the number of moles of chlorine required. If the reducing agent will take up only one atom of chlorine, about equal molar amounts of chlorine and reducing agent should be used.

In the preferred embodiment of my invention, the alkylphenol is chlorinated using chlorine as the chlorinating agent at a temperature within the range 25° C. to 100° C. and at atmospheric pressure. The alkylphenol is preferably one having an open ortho-position, a lower alkyl ($C_1$–$C_4$) group in the para-position which is either a primary or secondary alkyl group, and at least one lower alkyl ($C_1$–$C_4$) group in a meta- position. I prefer not to use a catalyst. Either zinc dust or iron metal in the form of filings is the preferred reducing agent. The generally preferred procedure is to maintain a stirred mixture of the feed alkylphenol, reducing agent, and water (if the reducing agent is a metal; otherwise benzene) at the reaction temperature while adding chlorine at a substantially constant rate. The system is vented periodically if necessary to release hydrogen that may be formed. After all the chlorine is added, stirring is continued for a brief period. The reaction mixture is filtered to remove unconverted metal. The product is then distilled to recover the desired chloralkylphenol.

Examples 1 to 6 inclusive describe the chlorination of 3,4-xylenol to form 6-chloro-3,4-xylenol. The latter is used in the manufacture of the commercial insecticide N-methyl-6-chloro-3,4-xylyl carbamate. The first three examples describe standard chlorination techniques not embodying my invention applied to the chlorination of 3,4-xylenol. The low yields of chlorinated 3,4-xylenol are readily apparent. Examples 4–6 describe chlorination techniques where my invention was applied. A comparison of the two sets of examples clearly illustrates the effectiveness and utility of my invention.

When the chlorinated phenol obtained by the use of my invention contains a number of isomers, the production of the desired isomer may be maximized by varying the reaction conditions and solvents employed. Specifically, as in the case of the 6-chloro- and 2-chloro- isomers of 3,4-xylenol, the production of the 6-chloro- isomer may be increased by increasing the amount of hydrocarbon solvent present and lowering the reaction temperature. The right hand column of Table IV illustrates how the isomer yields may be varied by using this procedure.

DESCRIPTION OF THE PREFERRED EMBODIMENTS

The following examples are set forth to further illustrate the features of the invention and the advantages thereof.

EXAMPLE 1

Non-reductive chlorination of 3,4-xylenol with $Cl_2$ (see Table I)

The parameters and the results of these reactions are tabulated in Table I. The reactions employing gaseous chlorine were carried out in a 4-necked flask fitted with a gas-tight stirrer, thermometer and gas inlet tube. The inlet tube was adjusted so that the chlorine was released to the vapor space immediately above the liquid level. Pressure in the flask was monitored by an open end mercury manometer. A stopcock was provided to vent air from the vessel at the beginning of the chlorine addition. Chlorine was fed through a rotameter from a cylinder mounted on a large balance.

The method is typified by Run No. 1. The reaction flask was charged with 61 grams (0.5 mole) of 3,4-xylenol and 200 ml. of benzene. Then, 250 ml. of water at 20° C. was added to the solution. Over a period of 77 minutes, 36 grams of chlorine were charged at a constant rate with thorough agitation. Maximum pressure generated was 20 mm. Hg. The temperature was maintained at 20° C. by means of a cold water bath. After an additional hour, the reaction mixture was transferred to a separatory funnel. The pale yellow benzene phase was washed with 100 ml. of $H_2O$ and with 50 ml. of a 1:1 brine-10% aqueous sodium bicarbonate solution and was then dried over $MgSO_4$.

The infra-red spectrum of an evaporated film of the benzene solution of product displayed an intense band at $6.00\mu$ and a moderately strong band at $6.15\mu$, indicating the presence of a 4-chloro-2,5-cyclohexadienone.

The dried solution was Claisen-distilled. At temperatures above 40°–50°, the chlorination product rapidly darkens and HCl is evolved. For this reason, the vacuum pump must be protected by a caustic-soda lime trap. After the removal of benzene, 48.3 grams of yellow distillate were collected, mostly at 129–157°, 50 mm. Hg, to an end point of 220° and 20 mm. Hg. A dark residue which remained weighed 19.0 grams and was soluble in hot toluene or acetone. The distilled products were analyzed by gas chromatography.

TABLE I

Non-reductive chlorination of 3,4-xylenol with $Cl_2$

| Run No. | Solvent(s) (ml.) | Temperature (° C.) Start | Temperature (° C.) Completion | Percent conversion of 3,4-xylenol | Yields, percent of theory [1] 2-chloro | 6-chloro | Dichloro | Total |
|---|---|---|---|---|---|---|---|---|
| 1 | $H_2O$ (250); $C_6H_6$ (200) | 20 | 20 | 96.7 | 20.9 | 36.2 | 2.1 | 59.2 |
| 2 | $H_2O$ (250); HOAc (250) | 19–23 | 19–23 | 95.0 | 23.9 | 32.6 | 1.4 | 57.9 |
| 3 | $H_2O$ (250); $H_2O$ (250) | 60 | 60 | 98.8 | 16.0 | 20.1 | 3.9 | 40.0 |
| 4 | $C_6H_6$ (200); NaOAc (.75 mole) | 20 | 20 | 95.6 | 21.4 | 36.3 | 3.5 | 61.2 |
| 5 | $H_2O$ (500); NaOH (1.0 mole) | 20–24 | | 79.2 | 7.6 | 7.3 | 8.7 | 23.6 |

[1] Based on converted 3,4-xylenol.

EXAMPLE 2

Non-reductive chlorination of 3,4-xylenol with sulfuryl chloride (see Table II)

The reactions were carried out in an Ace "Minilab" glass reaction vessel. The vessel was fitted with a stirrer, thermometer, and dropping funnel. The flask was vented through a drying tube containing Drierite to an Erlenmeyer flask containing sufficient $H_2O$ to absorb the acidic off-gases. The 3,4-xylenol (0.2 mole) was placed in the flask and warmed, if necessary, to effect solution. The temperature was then adjusted to that selected for chlorination. In reactions at low temperature, the xylenol sometimes crystallized from the solvent to form a fine slurry on cooling. Catalyst, if any, was then added. The sulfuryl chloride (0.2 mole) was added dropwise over a period of 0.5–1 hour while the reaction mixture was vigorously agitated. The resulting clear solution was allowed to stand an additional 3–4 hours.

The reaction mixture was cooled to 20° C. and poured with stirring slowly into 100 ml. of cold $H_2O$. The oil phase was extracted with ether. The extract was washed with brine containing sodium bicarbonate to remove the dissolved acid. The ether solution was dried over $MgSO_4$, the solvent removed, and Claisen-distilled at 50 mm. Hg to a final pot temperature of 200° C. The products were analyzed by gas chromatography.

lation at 50 mm. Hg to a pot temperature of 200° gave 17.3 grams of distillate boiling above benzene and 9.9 grams of a pitchy residue. The reaction products were analyzed by gas chromatography.

TABLE III
Non-reductive chlorination of 3,4-xylenol with (t-Bu)OCl

| Run No. | Solvent(s) (ml.) | Temperature, °C. Start | Temperature, °C. Completion | Percent conversion 3,4-xylenol | Yields, percent of theory 2-chloro | 6-chloro | Dichloro | Total |
|---|---|---|---|---|---|---|---|---|
| 1 | C₆H₆ (45) | 19 | 20 | 87.0 | 14.5 | 27.4 | 6.3 | 48.2 |
| 2 | C₆H₆ (25) | 20–25 | 21–79 | 92.6 | 12.8 | 23.8 | 9.6 | 46.2 |
| 3 | C₆H₆ (45) / H₂O (100) | 20 | 20 | 61.2 | 19.0 | 31.5 | 2.1 | 52.6 |

EXAMPLE 4

Reductive chlorination of 3,4-xylenol with $Cl_2$ and Zn (see Table IV)

The method used is typified by Run No. 6 in Table IV. It will be seen that this method, except for the addition of a reducing agent, is much like the method employed in Example 1.

A 500 ml. 4-necked reaction flask fitted with a gas-tight stirrer, thermometer and gas inlet tube was charged with 61 grams (0.5 mole) of 3,4-xylenol, 25 grams (0.38 mole) of Zn dust and 100 ml. of $H_2O$. The stirred mixture was heated to 80° C. and 50 grams (0.70 mole) of $Cl_2$ was added at a constant rate over 98 minutes. The flask was partially insulated so that the temperature was maintained at 80° C. by the heat of reaction. The system was vented from time to time whenever the pressure reached 40 mm. Hg. The pressure was due to $H_2$ gas. After all of the $Cl_2$ had been charged, stirring was continued for an additional 15 minutes. The reaction mixture was vacuum-filtered to remove excess Zn dust and the flask and filter cake were rinsed with 100 ml. of benzene. Recovered Zn dust weighed 9.5 grams. The benzene solution of the product was washed with 100 ml. of $H_2O$, then with 50 ml. of a 1:1 brine-10% aqueous $NaHCO_3$ solution and was dried over $MgSO_4$. Claisen distillation of the product yielded 72.3 grams of distillate and 2.9 grams of residue. The products were analyzed by gas chromatography.

TABLE II
Non-reductive chlorination of 3,4-xylenol with $SO_2Cl_2$

| Run No. | Solvent(s) (ml.) | Catalyst (gm.) | Temperature, °C. Start | Temperature, °C. Completion | Percent conversion 3,4-xylenol | Yield, percent of theory 2-chloro | 6-chloro | Dichloro | Total |
|---|---|---|---|---|---|---|---|---|---|
| 1 | HOAc (25) | None | 20 | 20 | 97.1 | 18.6 | 31.8 | 0.4 | 50.8 |
| 2 | HOAc (25) | do | 70 | 70 | 95.0 | 19.7 | 29.7 | 0.5 | 49.9 |
| 3 | C₆H₆ (25) | do | 20 | 20 | 95.6 | 14.0 | 27.3 | 0.3 | 41.6 |
| 4 | C₆H₆ (25) | AlCl₃ (1.0) | 20 | 20 | 98.6 | 12.3 | 26.5 | 0.3 | 39.1 |
| 5 | None | None | 70 | 70 | 93.1 | 13.3 | 20.5 | 0.5 | 34.3 |
| 6 | do | AlCl₃ (1.0) | 70 | 70 | 92.2 | 12.7 | 21.3 | 0.4 | 34.4 |

EXAMPLE 3

Non-reductive chlorination of 3,4-xylenol with t-butyl OCl (see Table III)

The method used is typified by Run No. 2 in Table III. The reaction were carried out in the same equipment as used in Example 2. A solution of 24.5 grams (0.2 mole) of 3,4-xylenol in 45 ml. of benzene was converted to a fine crystal slurry by cooling to 19° C. t-Butyl hypochlorite (0.2 mole) was added dropwise with stirring over a period of 74 minutes. The temperature was maintained by a cold $H_2O$ bath. Exothermicity ceased as soon as all the hypochlorite had been added. After an additional hour at 20°, the reaction mixture was washed free of acid with $H_2O$ and aqueous sodium metabisulfite and the dried over $MgSO_4$. Claisen distil- TABLE IV
Reductive chlorination of 3,4-xylenol using Zn and elemental $Cl_2$

| Run No. | Moles Cl₂ | Solvent(s) (ml.) | Temperature, °C. Start | Temperature, °C. Completion | Percent conversion 3,4-xylenol | Yields, percent of theory [1] 2-chloro | 6-chloro | Dichloro | Total |
|---|---|---|---|---|---|---|---|---|---|
| 1 | 0.76 | H₂O (100) / C₆H₆ (75) / C₆H₁₄ (25) | 0 | 0–50 | 98.8 | 31.7 | 55.0 | 7.8 | 94.5 |
| 2 | 0.76 | H₂O (100) / C₆H₆ (100) | 20 | 20 | 99.7 | 32.8 | 54.3 | 7.5 | 94.6 |
| 3 | 0.76 | H₂O (100) / C₆H₆ (100) | 50 | 50 | 100.0 | 31.5 | 49.6 | 15.7 | 96.8 |
| 4 | 0.75 | H₂O (100) / C₆H₁₂ (100) | 50 | 50 | 100.0 | 35.6 | 51.7 | 9.3 | 96.6 |
| 5 | 0.70 | H₂O (100) | 50 | 50 | 88.6 | 38.4 | 49.2 | 5.6 | 93.2 |
| 6 | 0.70 | H₂O (100) | 80 | 80 | 90.0 | 37.0 | 46.2 | 6.3 | 89.5 |

[1] Based on converted 3,4-xylenol.

EXAMPLE 5

Reductive chlorination of 3,4-xylenol using $Cl_2$ and iron

A chlorination procedure analogous to that used in Example 4 was carried out at 25° C. using 25 grams of Fe instead of Zn as the reducing agent and a solvent mixture comprising 100 ml. of benzene and 100 ml. of $H_2O$. The distillate was analyzed by gas chromatography. Yields were: 2-chloro-3,4-xylenol, 30.1%; 6-chloro-3,4-xylenol, 49.6%; dichloroxylenol, 14.6%, based on a 96% conversion of xylenol.

EXAMPLE 6

Reductive chlorination of 3,4-xylenol using $Cl_2$ and $SnCl_2$

Another chlorination analogous to that used in Example 4 was carried out at 25° C. using 0.38 mole of $SnCl_2 \cdot 2H_2O$ as the reducing agent, 0.38 mole of $Cl_2$ as the chlorinating agent, and 100 ml. of benzene and 200 ml. of 6N HCl as solvents. The distillate was analyzed by gas chromatography. The results of the reaction were conversion of 3,4-xylenol, 71.0%. Yields: 2-chloro-3,4-xylenol, 30.7%; 6-chloro-3,4-xylenol, 51.2%; dichloroxylenol, 1.2%, based on converted xylenol.

EXAMPLE 7

In order to further illustrate the utility of my invention and to demonstrate the types of phenols to which my invention is applicable, a number of other phenols were chlorinated using a standard technique both with and without the presence of a reducing agent. The technique is analogous to that used in Example 4. All runs were conducted at 25° C. and all used 100 ml. of $H_2O$ and 200 ml. of benzene as solvents. The products obtained from the non-reductive chlorinations were yellow. Those obtained from the reductive chlorinations were colorless even before distillation. The results of these reactions and the parameters varied are tabulated in Table V.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated.

I claim:

1. In the nuclear chlorination of an alkylphenol having at least one open ortho- position, an alkyl group containing from 1 to 4 carbon atoms selected from the class consisting of primary and secondary alkyl groups in the para- position, and at least one alkyl group containing from 1 to 4 carbon atoms in the meta- position, the improvement comprising chlorinating said alkylphenol by means of a chlorinating agent selected from the class consisting of chlorine, sulfuryl chloride and t-butyl hypochlorite at a temperature between —20° and 100° C. and a pressure between 0.5 and 5 atmospheres in the presence of a reducing agent selected from the group consisting of iron metal, zinc metal, hydriodic acid and stannous chloride, the amount of said reducing agent being at least 0.3 mole per mole of said alkylphenol.

2. In the nuclear chlorination of an alkylphenol having at least one open ortho- position, an alkyl group containing from 1 to 4 carbon atoms selected from the class consisting of primary and secondary alkyl groups in the para- position, and at least one alkyl group containing from 1 to 4 carbon atoms in the meta- position, the improvement comprising chlorinating said alkylphenol by means of a chlorinating agent selected from the class consisting of chlorine, sulfuryl chloride and t-butyl hypochlorite at a temperature between —20° and 100° C. and a pressure between 0.5 and 5 atmospheres in the presence of a reducing agent selected from the class consisting of Zn metal and Fe metal, the amount of said reducing agent being at least 0.3 mole per mole of said alkylphenol.

3. The method of Claim 2 in which the chlorination is conducted in the presence of water.

4. The method of Claim 3 in which the alkylphenol is selected from the class consisting of 3,4-xylenol, 2,4,5-trimethylphenol, 3,4,5-trimethylphenol and 4-isopropyl-m-cresol.

5. The method of Claim 4 in which the chlorinating is at a temperature between 25° and 100° C. and at atmospheric pressure.

6. The method of Claim 5 in which the alkylphenol is 3,4-xylenol, the chlorinating agent is chlorine.

7. The method of Claim 6 in which the reducing agent is zinc metal.

TABLE V

Comparison of reductive and non-reductive chlorinations of various phenols

| Run No. | Phenol (moles) | Moles $Cl_2$ | Reducing agent (gram-atoms) | Percent conversions of phenol | Yields, percent of theory | | |
|---|---|---|---|---|---|---|---|
| | | | | | 2-chloro | 6-chloro | Dichloro |
| 1 | 2,4,5-trimethylphenol (0.25) | 0.25 | None | 89.9 | | 63.6 | |
| 2 | do | 0.38 | Zn (0.19) | 99.5 | | 97.0 | |
| 3 | 3,4,5-trimethylphenol (0.18) | 0.18 | None | 96.0 | 37.8 | | |
| 4 | do | 0.28 | (0.14) | 95.2 | 91.4 | | |
| 5 | 4-isopropyl-m-cresol (0.25) | 0.25 | None | 91.2 | 14.9 | 41.1 | 4.3 |
| 6 | 4-isopropyl-m-cresol (0.23) | 0.38 | Zn (0.19) | 100.0 | 20.8 | 70.6 | 8.5 |

References Cited

UNITED STATES PATENTS

| | | | |
|---|---|---|---|
| 2,494,993 | 1/1950 | Foster | 260—623 H |
| 3,012,035 | 12/1961 | Knowles | 260—623 H |
| 3,035,099 | 5/1962 | Lynch | 260—623 H |
| 3,401,205 | 9/1968 | Yoon | 260—623 H |
| 3,542,882 | 11/1970 | Ashall et al. | 260—623 H |

FOREIGN PATENTS

| | | | |
|---|---|---|---|
| 1,292,661 | 3/1969 | Germany | 260—623 H |
| 1,203,275 | 10/1965 | Germany | 260—623 H |

OTHER REFERENCES

Foreman et al., "J.A.C.S." vol. 76, pp. 4977–79 (1954).
Gleed et al., "J. Chem. Soc." (London) (1948), pp. 209–11.

BERNARD HELFIN, Primary Examiner

W. B. LONE, Assistant Examiner